Figure 1:
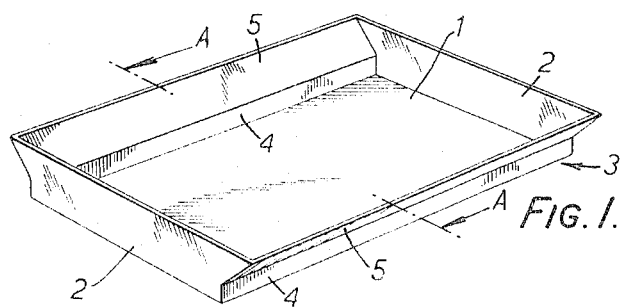

INVENTOR
PAOLO D. PORTA,
BY
ATTORNEY

United States Patent Office 3,289,314
Patented Dec. 6, 1966

3,289,314
FREEZE DRYING
Paolo Della Porta, Milan, Italy, assignor to Edwards High Vacuum International Limited, Sussex, England, a British company
Filed Dec. 19, 1963, Ser. No. 331,652
Claims priority, application Great Britain, Dec. 19, 1962, 47,948/62
6 Claims. (Cl. 34—92)

This invention relates to vacuum freeze drying particularly but not exclusively of liquid foodstuffs and slurries and has for its object an improved method of and apparatus for performing freeze drying.

In known apparatus for vacuum freeze drying, a foodstuff to be dried may be frozen into a flat slab and placed in a sealed chamber which is then evacuated. The water in the foodstuff now in the ice phase is caused to sublime, by heating, and the vapour is condensed and collected in a cold trap, or is absorbed or directly pumped away. The latent heat of fusion and evaporation or sublimation of water in its respective phase changes is known to be supplied by conduction or radiation of heat from plates or grids in contact with, or spaced from, the boundary surface or surfaces of the flat slab. These known forms of apparatus suffer from disadvantages, for example a foodstuff may be frozen into the form of a flat slab and heated under vacuum by radiation or conduction to either or both of its sides. The result of this form of heating is that after the portions of the frozen slab at or near the surface have sublimed, the vapour been driven off, and the surface layer, (sometimes referred to as the "dry shell"), dried, the portions of the slab lying deeper become thermally insulated from the heating means by the dry, or substantially dry shell. An increase in the power supplied to the heating means or an increase in their temperature may cause excessive heating of the dry shell particularly at the outer boundaries thereby irreversibly damaging them. Attempts to overcome this difficulty by enclosing the slab between two heating plates under pressure to increase the thermal contact between the slabs of foodstuff and the heating plates merely introduces a further difficulty in that vapour driven off is unable to escape from the surface portion due to the presence of the heating plates. A compromise in which, for example, expanded metal mesh is interposed between the slab and a heating plate may still exert a "stifling" effect on the vapour on the one hand, or not conduct heat sufficiently readily on the other.

In cases where the rate of sublimation is not limited by the rate at which heat is transferred to the dry surface boundaries it may still be limited by the rate at which it is transferred through the dry shell.

To obtain the maximum rate of sublimation consistent with not melting the frozen mass or overheating the dry shell, a high rate of heat transfer to and within the dry shell is required and this is normally only obtained by the use of heating plates or elements operating at temperatures between 40° C. and 160° C. There is thus not only the risk of spoiling the product to be considered but the difficulty of using so-called low grade or waste heat, or heat which has been recovered or regenerated from some other process by use, for example, of a heat pump.

The purpose of the present invention is therefore to provide an improved method of and apparatus for the freeze drying of foodstuffs which overcome the above mentioned difficulties. Such freeze drying would normally be carried out under vacuum but could be conducted at pressures up to an exceeding atmospheric.

According to the present invention a method of freeze drying material includes the steps of placing the material in its unfrozen state in conducting and preferably surrounding relation to a heat transferring means and freezing the material onto the heat transferring means.

Further steps may include placing the frozen material together with the heat transferring means in an evacuable chamber, reducing the pressure in the chamber and supplying heat to the frozen material by conduction from the heat transferring means.

The heat transferring means may be a substantially plane sheet having formed therein a fluid passage or passages extending between an inlet and an outlet, the sheet also having formed therein a plurality of holes, the step of freezing the material may be carried out by passing a cooling fluid through the fluid passage or passages, the frozen material transfixing the sheet through the holes formed therein, and the step of supplying heat to the frozen material in the chamber may be carried out by passing a heating fluid through the fluid passage or passages.

Apparatus for carrying out the method may include heat regenerating means so that in operation some at least of the heat given up by water vapor condensing and freezing in the evacuable chamber or in a communicating chamber is transferred to the heating fluid by the heat regenerating means.

Alternatively, heat may be obtained from a so-called "low grade" or waste source.

Alternatively the heat transferring means may be an interstitial heater grid of electrically conducting material operable to conduct heat to the frozen material, or an interstitial support grid having thereon or wound into it an electrical heater element or elements operable to conduct heat to the frozen material and the step of freezing the material may be carried out by placing the material together with the heat transferring means in thermal contact with an independent cooling means, the frozen material transfixing the heat transferring means through its interstices.

In any of the methods the further step of supplying heat to the frozen material when in the chamber by a second heat transferring means may be included and the second heat transferring means may be operable to supply heat to the frozen material by radiation.

Figure 2:
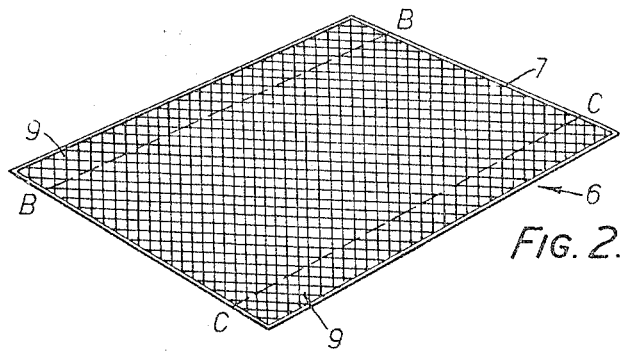
Figure 3:
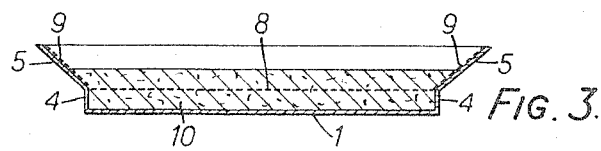
Figure 4:
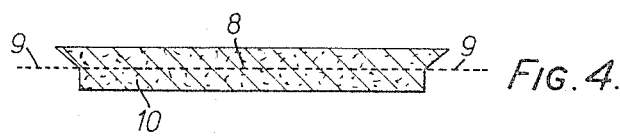
Figure 5:
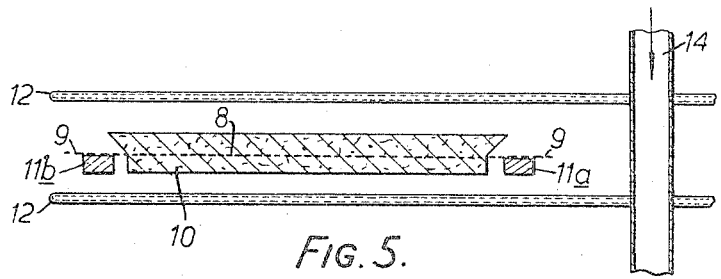
Figure 6:
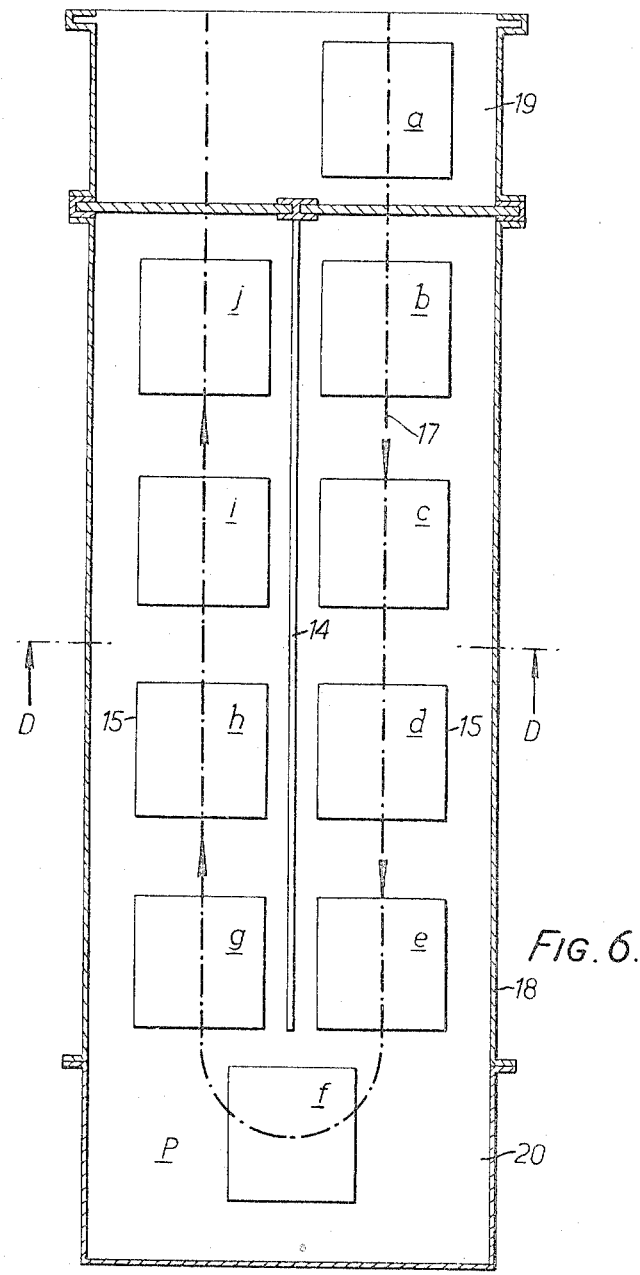
Figure 7:
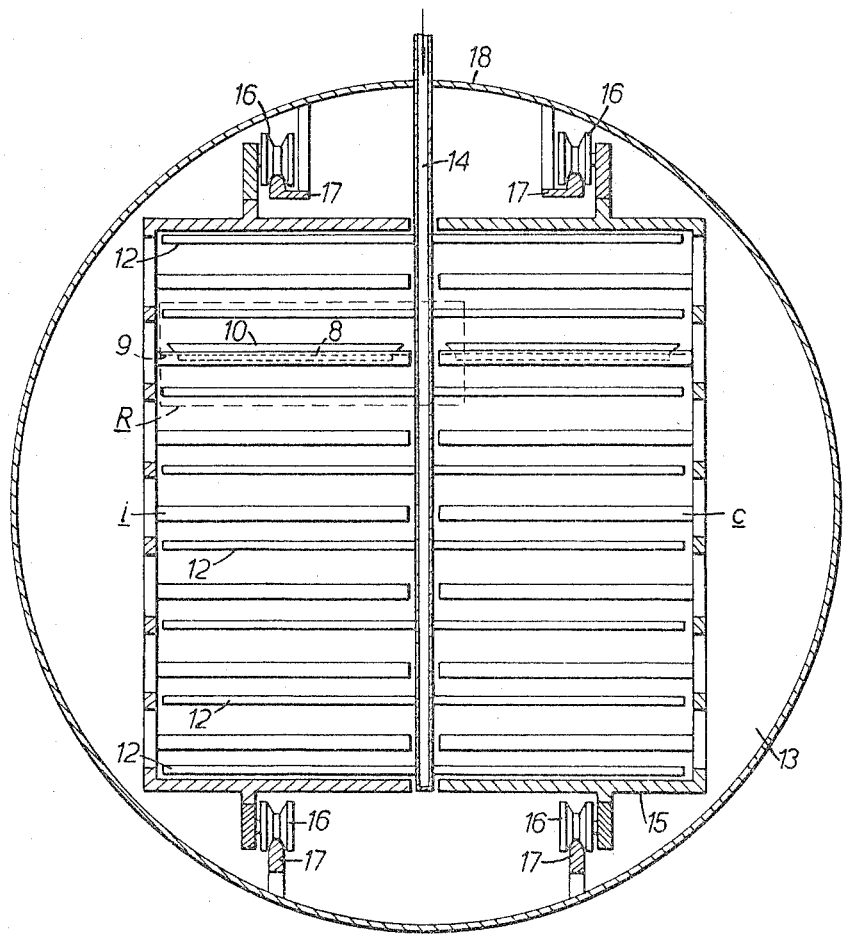
Figure 8:
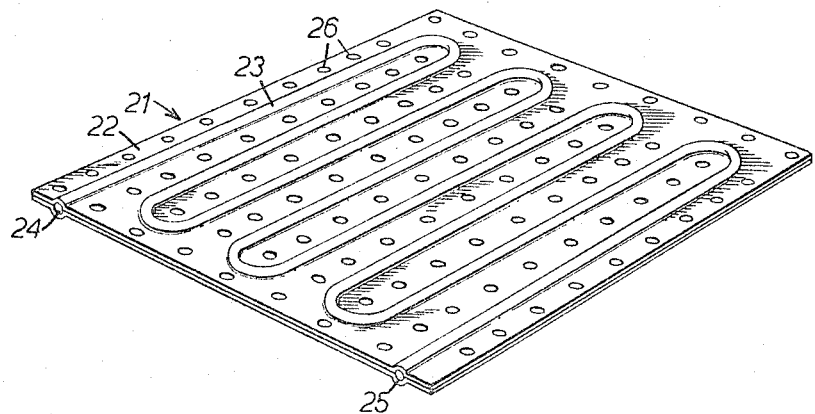
Figure 9:
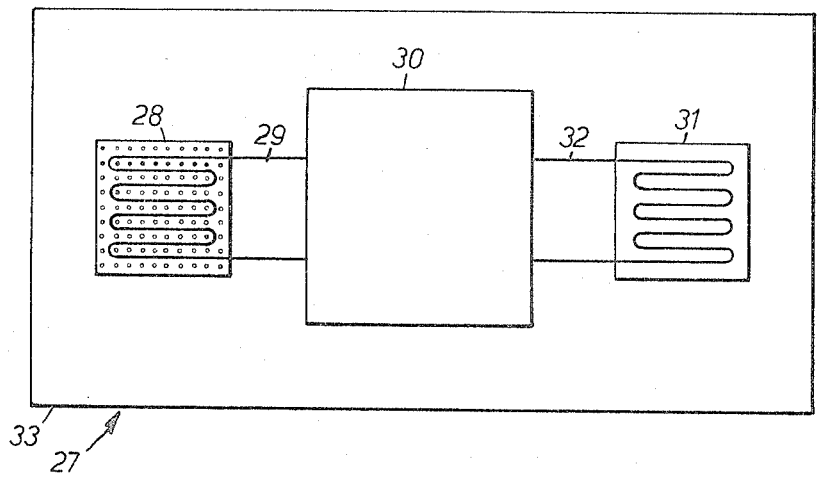

By way of example only the invention will now be described in greater detail with reference to the accompanying drawings in which:

FIGURE 1 is a perspective view of a freezing tray,
FIGURE 2 is a perspective view of a grid heater,
FIGURE 3 is a sectional view of the freezing tray on a line A—A in FIGURE 1,
FIGURE 4 is a sectional view of a frozen slab of material with a grid heater embedded therein,
FIGURE 5 is a sectional view of a frozen slab of material mounted in the vacuum chamber,
FIGURE 6 is a schematic horizontal section through the vacuum chamber,
FIGURE 7 is a vertical section through the vacuum chamber along the line D—D in FIGURE 6,
FIGURE 8 is a perspective view of a fluid heater; and
FIGURE 9 is a schematic diagram showing a heating circuit.

A freezing tray 3 illustrated by FIGURE 1 consists of an open top tray having a flat bottom 1, and vertical end walls 2. Side walls are constructed with vertical walls 4 extending from the bottom to a third the height of the tray, thereabove the side walls extend upwardly and outwardly to form flanges 5.

An electrical grid heater 6 illustrated in FIGURE 2 is constructed from a wire frame 7 on which a mesh comprising a plurality of resistance elements is mounted. The grid 6 is folded along the lines BB, CC to form a flat portion 8 and two upwardly inclined portions 9, and fits into the freezing tray 3 with the folded portions 9 to the grid heater in engagement with the upwardly inclined flange portions 5 of the freezing tray side walls. The functions of the grid heater 6 may equally well be performed by an electrical resistance grid which may be in the form of conducting wires or, for example, glass fibre cloth impregnated with graphite with or without superficial electrical insulation, or an electrically heated perforated plate provided on either or both sides with indentations, protrusions (e.g. spikes), or a "key" to lock into the material when frozen.

FIGURE 5 shows an enlarged view of the region enclosed by the dotted line R in FIGURE 7 and depicts the disposition of a frozen slab 10 with embedded heater grid 8 between radiant heater plates 13 within a vacuum chamber 13. The heater grid flange portions 9 are supported on electrodes 11a, 11b connected through vacuum tight electrical connections to a main step down transformer outside the chamber (not shown). The radiant heater plates 12 are constructed in the form of hollow metal shallow boxes lying in a plane parallel to the plane of the frozen slab and being at least as large as to cover the frozen slab in projection. These heater plate boxes are open on one side where they join a central hollow member 14 extending the length of the chamber, and closed at its lower end but open at its top end to receive steam to supply heat to the heater plates 12. These heater plates may heat by radiation or by conduction or convection through residual gas or vapour or by a combination of all three. Alternatively, the second heating means may be of the type used in the so-called A.F.D. process in which the product is sandwiched between sheets of expanded metal or perforated on embossed sheets which are in turn sandwiched between movable heater plates.

FIGURE 7 shows an assembly of heated plates mounted in tiers either side of the hollow member 14 and between each pair of heater plates a frozen slab. The assembly of plates 12 and hollow member 14 is fixed rigidly to a housing 18 of the vacuum chamber, whilst the frozen slab assembly with each slab supported by a pair of electrodes is mounted on a movable carriage 15 mounted on runners 16 slidable along rails 17 themselves rigidly fixed to the vacuum chamber housing 18. It will be noticed that FIGURE 7 depicts two such movable carriage assemblies one each side of member 14 which effectively divides the vacuum chamber 13 into two compartments.

FIGURE 6 shows the vacuum chamber in plan. The chamber is divided into two adjacent portions 19 and 20 interconnecting, but isolatable in operation from one another and from the atmosphere by vacuum tight air locks. The portion 19 is a loading chamber and the portion 20 is a freeze drying chamber divided into two compartments.

The figure shows 10 carriages. One $a$ is in the loading chamber 19, four $b$, $c$, $d$ and $e$ are passing through the first compartment along rail 17 in the direction shown by the arrow, four $g$, $l$, $i$ and $j$ are passing through the second compartment and one, $f$, is intermediate the two compartments.

In operation of a vacuum freeze drying process on a foodstuff just described the following stages take place.

The foodstuff is placed in the tray 1 up to the level of the vertical portions of the side walls 4. The heater grid 8 is folded along lines BB, CC so that flange portions 9 extend upwardly and outwardly. The grid is placed in the tray 1 over the foodstuff and more foodstuff placed over the heater up to two thirds of the depth of the tray. The foodstuff is now able to transfix the heater grid. The tray with its contents is now placed in a refrigerator and the foodstuff frozen.

The material could be in the form of a liquid or a slurry. Alternatively, slices or slabs of a wet solid could be placed on either side of the first heating means before freezing. Water or a suitable aqueous solution or an oil or wax could be used so that when frozen it acted as a "cement" adhering to or transfixing the first heating means.

The frozen slab is removed from the tray and the flange portions 9 folded back to their original positions coplanar with the main grid 8. The frozen slab is loaded into a carriage in the loading chamber 19 isolated from the vacuum chamber 20 with flanges 9 supported on two electrodes 11a, 11b. The chamber 19 is isolated from the atmosphere and evacuated. The chamber 19 is connected to the chamber 20 and the loaded carriage moved into the evacuated chamber 20. The radiant heating plates are operated as the carriage passes through the first compartment up to the point P. During this period the surface portions of each slab become dried. Once past the point P the radiant heating plates are not operated but the embedded grid heaters are. The central regions of each slab are now dried as the carriage passes through the second compartment of the chamber 20. The carriages are unloaded when they reach chamber 19 once more.

FIGURE 8 illustrates an alternative form of heater 21. An aluminum sheet 22 has a fluid passage 23 formed in it standing proud of the faces of the sheet, the passage 23 being of serpentine form and having an inlet 24 and an outlet 25. Additionally a plurality of holes 26 are formed in the sheet.

In use this heater 21 is embedded in a mass of foodstuff. Cooling fluid is then passed through the passage 23 until the foodstuff is frozen. Alternatively the foodstuff may be frozen in a manner similar to that employed in connection with the grid heater 6 already described. As a further alternative to the embedding of the heater 21 in a mass of material to be dried, in the case of a liquid product it may be sprayed onto the heater whilst cooling fluid is passed through the heater 21. By this method, wastage of the product is avoided. The holes 26 allow the foodstuff to transfix the heater 21. In operation of the heater 21 a heating fluid is passed from the inlet 24, through the passage 23 to the outlet 25. Since the sheet 22 is of good thermal conductivity it assumes a substantially even temperature distribution and supplies the necessary latent heat of sublimation to the frozen foodstuff which is being dried.

A special advantage of this method of heating is the ease and cheapness of construction of equipment embodying it, and the high loading density of the drying cabinet which it makes possible. A further advantage is the ease and rapidity with which pre-freezing can be carried out and the ease with which the product can be kept frozen until freeze-drying begins.

By incorporating in a freeze drying plant fluid heaters, such as the heater 21 just described, it is possible to employ a heating system including a heat pump which has advantages over a system in which electrical heaters are used. FIGURE 9 illustrates schematically a freeze drying plant 27 including a fluid heater 28 in a fluid heating circuit 29, a heat pump 30, and a condenser 31 in a condenser fluid circuit 32, all enclosed in an evacuable chamber 33.

In operation of the heater 28 during a freeze drying process heat is given up by the heating fluid in the fluid heating circuit 29 to the frozen material thereby supplying latent heat of sublimation to cause water molecules in the ice phase to sublime. Molecules of water vapour are then condensed on the condenser 31, the surface temperature of which is kept lower than that of the frozen material, thereby giving up latent heat of condensation and fusion to the fluid that is passing through the condenser fluid circuit 32. The heat pump 30, as is known in the art, then operates to transfer heat from the condenser fluid circuit 32 to the fluid heating circuit 29 to supply heat at a relatively low temperature to the fluid heater 28. Excess heat is removed by melting ice removed from the condenser in a previous cycle or by means of a small heat pump which rejects the excess heat to a cooling flow of water. The use of such a regenerative cycle represents a considerable saving since some or all of the heat supplied to sublime ice in the foodstuff is recaptured and used again. When an electrical heater is used the heat supplied by the heater is lost from the system since water molecules evaporated from the frozen foodstuff give up their latent heat to a cold trap or similar appliance when they condense and this heat cannot be conveniently turned back into electrical energy.

The heat pump may in alternative arrangements be used to extract heat from natural surroundings such as earth, water or air and transfer it to the heating fluid. Yet another alternative is to use the heat pump to transfer heat given up during the pre-freezing of the material to the heating fluid.

The heating and condensing fluids may be ethylene glycol and refrigerant 12 respectively although other "secondary" refrigerants such as brine or heat transferring fluids such as di-ethylene glycol, carbitol, trichlorethylene, "Dekalin" or ethyl alcohol may be used as a heating fluid and Freon 12, Freon 22, ammonia, or methyl chloride may be used as a condensing fluid.

I claim:

1. Freeze drying apparatus comprising means for freezing on to heat transferring means material to be freeze dried, means for transferring heat to said material after it has been frozen on the said heat transferring means, an evacuable chamber and means in said chamber for supporting said heat transferring means, said heat transferring means consisting of a substantially flat sheet of material formed with a plurality of apertures through which frozen material disposed on both sides of the sheet has access from one side of the flat sheet to the other side of said sheet to transfix said material to said sheet through said apertures on freezing and means forming part of said sheet for effecting the supply of heat to said sheet.

2. Freeze drying apparatus comprising means for freezing on to heat transferring means material to be freeze dried, means for transferring heat to said material after it has been frozen on the said heat transferring means, an evacuable chamber and means in said chamber for supporting said heat transferring means, said heat transferring means consisting of a substantially flat sheet of material formed with a plurality of apertures through which frozen material disposed on both sides of the sheet has access from one side of the flat sheet to the other side of said sheet to transfix said material to said sheet through said apertures on freezing and means forming part of said sheet for effecting the supply of heat to said sheet, said means forming part of said sheet being constituted by a fluid passage extending between inlet and outlet means.

3. Freeze drying apparatus comprising means for freezing on to heat transferring means material to be freeze dried, means for transferring heat to said material after it has been frozen on the said heat transferring means, an evacuable chamber and means in said chamber for supporting said heat transferring means, said heat transferring means consisting of a substantially flat sheet of material formed with a plurality of apertures through which frozen material disposed on both sides of the sheet has access from one side of the flat sheet to the other side of said sheet to transfix said material to said sheet through said apertures on freezing and means forming part of said sheet for effecting the supply of heat to said sheet, said means forming part of said sheet being constituted by a fluid passage extending between inlet and outlet means, said passage being constructed for the passage therethrough of a heat transferring fluid.

4. Freeze drying apparatus comprising means for freezing on to heat transferring means material to be freeze dried, means for transferring heat to said material after it has been frozen on the said heat transferring means, an evacuable chamber and means in said chamber for supporting said heat transferring means, said heat transferring means consisting of a substantially flat sheet of material formed with a plurality of apertures through which frozen material disposed on both sides of the sheet has access from one side of the flat sheet to the other side of said sheet to transfix said material to said sheet through said apertures on freezing and means forming part of said sheet for effecting the supply of heat to said sheet, said sheet being constituted by a heater grid of electrically conducting material and thus being operable to apply heat internally of the frozen material transfixed thereto.

5. Freeze drying apparatus comprising means for freezing on to heat transferring means material to be freeze dried, means for transferring heat to said material after it has been frozen on the said heat transferring means, an evacuable chamber and means in said chamber for supporting said heat transferring means, said heat transferring means consisting of a substantially flat sheet of material formed with a plurality of apertures through which frozen material disposed on both sides of the sheet has access from one side of the flat sheet to the other side of said sheet to transfix said material to said sheet through said apertures on freezing and means forming part of said sheet for effecting the supply of heat to said sheet, said sheet being constituted by a support grid carrying an electrical heating element disposed to apply heat interiorly the frozen material transfixed thereto.

6. Freeze drying apparatus comprising means for freezing on to heat transferring means material to be freeze dried, means for transferring heat to said material after it has been frozen on the said heat transferring means, an evacuable chamber and means in said chamber for supporting said heat transferring means, said heat transferring means consisting of a substantially flat sheet of material formed with a plurality of apertures through which frozen material disposed on both sides of the sheet has access from one side of the flat sheet to the other side of said sheet to transfix said material to said sheet through said apertures on freezing and means forming part on said sheet for effecting the supply of heat to said sheet, the apparatus including a heat pump and a condenser and in which the heat transferred to the frozen material by said heat transferring fluid results in the production of water vapour which is condensed by said condenser, the latent heat of condensation being transferred by said heat pump to said heat transferring fluid.

References Cited by the Examiner

UNITED STATES PATENTS 3,169,070  2/1965  Mehrlich et al. _____ 34—5 X

FOREIGN PATENTS 1,017,726  12/1952  France.
552,821  4/1943  Great Britain.
922,493  4/1963  Great Britain.

ROBERT A. O'LEARY, *Primary Examiner.*

W. E. WAYNER, *Assistant Examiner.*